Figure 1:
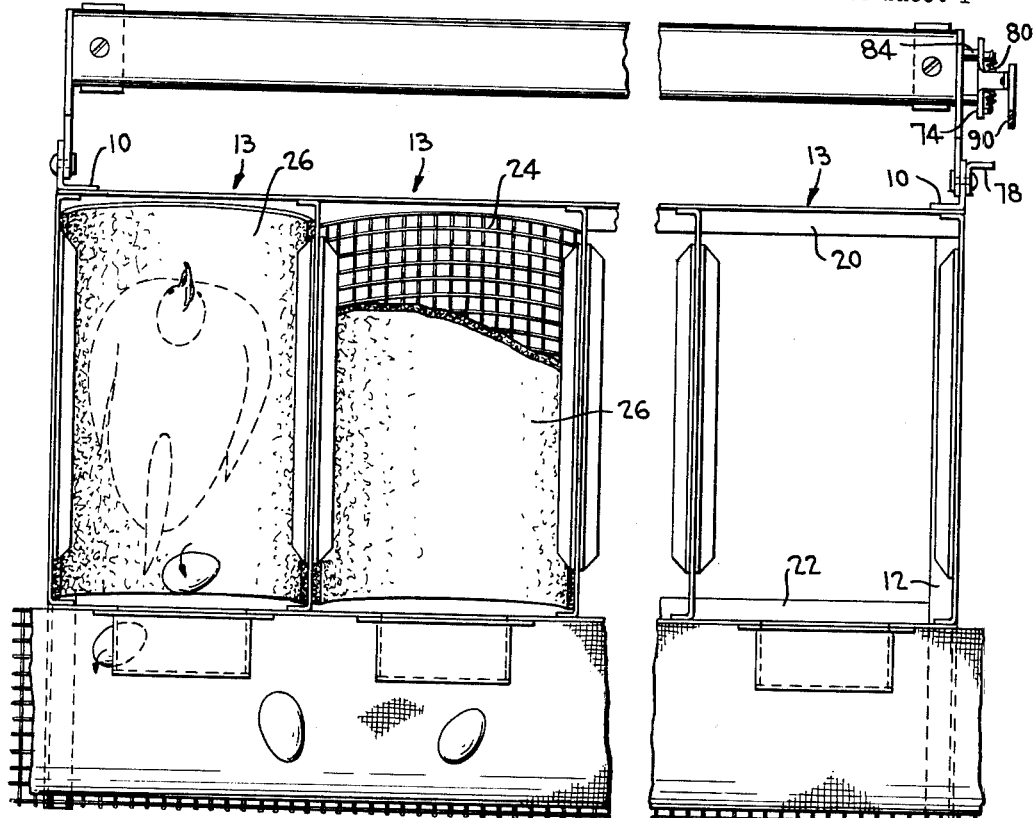

June 30, 1964     C. WILLAUER, JR     3,139,065
LAYING NEST FOR POULTRY

Filed April 26, 1963     2 Sheets-Sheet 1

INVENTOR
CHARLES WILLAUER, JR,
BY *Watson, Cole, Grindle & Watson*
ATTORNEYS

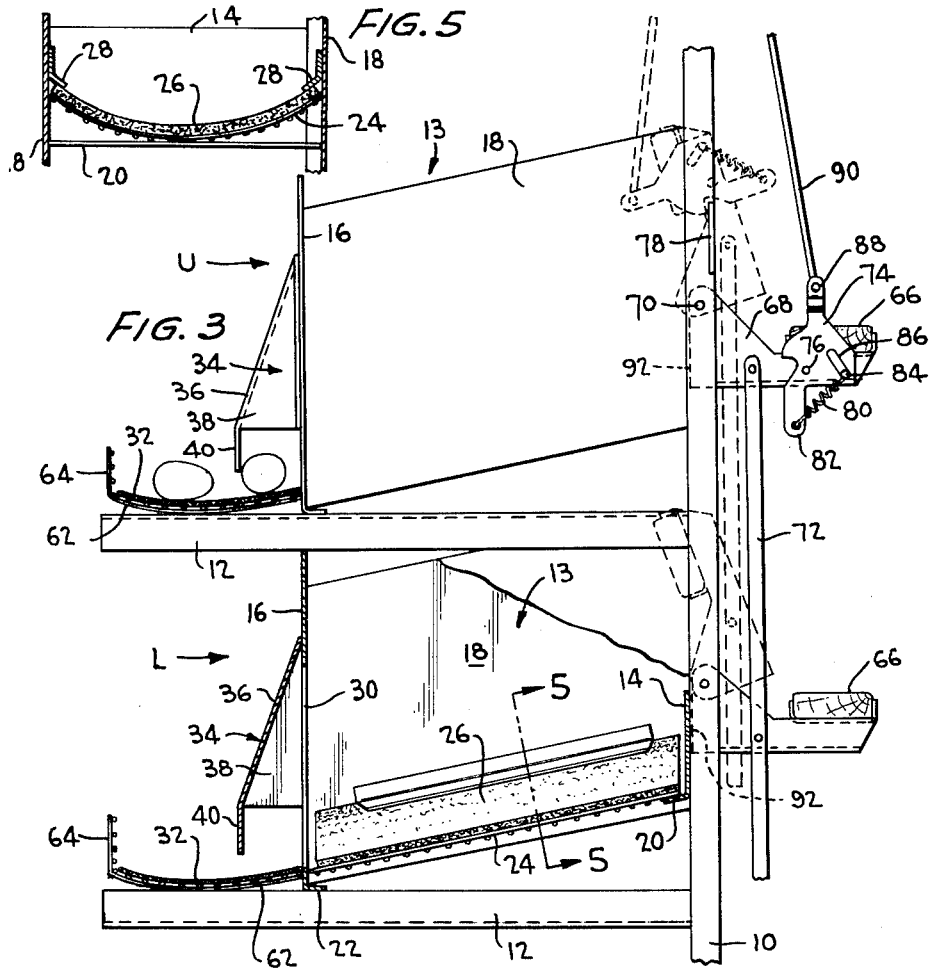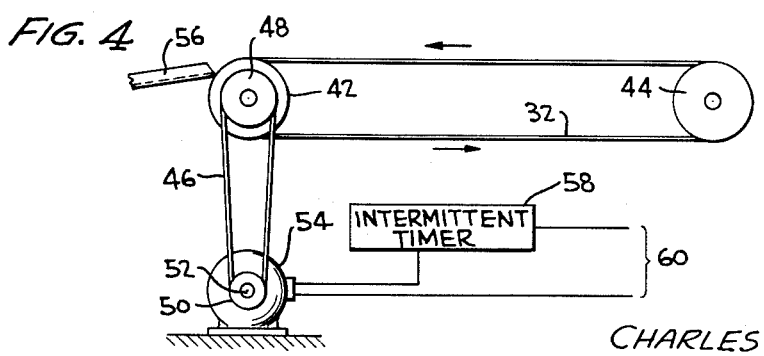

United States Patent Office 3,139,065
Patented June 30, 1964

3,139,065
LAYING NEST FOR POULTRY
Charles Willauer, Jr., 105 California Road,
Quakertown, Pa.
Filed Apr. 26, 1963, Ser. No. 275,965
10 Claims. (Cl. 119—48)

The invention relates to a laying nest for poultry of the class in which nests are generally arranged in batteries each consisting of one or more horizontal rows of adjoining nests having sloping bottoms which cause the eggs when laid to roll out through an opening in the nest and onto a conveyor to be promptly delivered to a desired collection point.

Such nests have the recognized advantages of permitting early cooling of the eggs and preventing or at least reducing the extent of breakage thereof by the hens. However, some difficulty arises in training the hens to use and inducing them to continue to use such nests.

With this in mind it is a primary object of the present invention to improve nests of general type in such manner as to render them more attractive to the hens and to facilitate the training of hens to their use.

It has been found that the attractiveness of the nest to a hen will be very substantially increased if, after an egg is laid in the nest, the egg is maintained at least for a reasonable period of time either within the nest or in such proximity thereto and to the hen that the hen may be physically close to and able to see the egg. Accordingly, by the present invention, means are provided for achieving this object.

At the same time, it is desired and therefore is an object of the invention to retain the advantages of the nest of the general type by promptly removing the eggs from the hen and from the laying portion of the nest so that they will not accumulate dirt or droppings to the extent to which they might if actually retained in the nest with the hen, while retaining the egg for a limited period in view of and accessible to the hen.

For achieving these ends, the present invention utilizes the battery or row of nests with sloping bottoms as aforementioned, together with an egg opening in each nest through which the eggs are delivered by gravity onto a conveyor belt. Longitudinally disposed and aligned barrier means supported over the belt just outside of each egg opening are arranged to arrest the movement of the eggs across the belt or conveyor. The conveyor itself will normally be at rest when it receives the egg or eggs and will be driven only at desired intervals. For instance, the conveyor may be actuated at timed intervals through a conventional timing device associated with its driving motor. Gaps are provided between adjoining barriers and means are provided for urging the eggs transversely outwardly through these gaps onto the belt proper as movement of the belt brings the eggs abreast of the respective gaps. Such means may conveniently consist simply in transversely sloping the belt downwardly away from the nest.

The egg openings in the respective nests will be of ample size to permit the free passage of eggs from the nest onto the belt but at the same time sufficiently small to prevent egress of the hens. For the purpose of disposing eggs on the belt in a common enclosure with their respective nests and thereby enhancing the attractiveness of the nest to the hens, it is desirable to provide in conjunction with each nest an egg bay projecting outwardly over the conveyor and preferably providing a support for the barrier such as above mentioned, the bays communicating with the respective nests through their egg openings. These bays are disposed to overhang the belt and the eggs thereon but to provide sufficient clearance above the belt to avoid interference with movement of the eggs. Furthermore the conformation of the respective egg bays may be such as to contribute to the action of the egg openings in preventing access by the hens to eggs on the conveyer outside of the egg bays while yet maintaining the eggs positioned for limited periods within the bays for access by the hens. For instance, the respective bays may be provided with roofs or other portions above the eggs and overhanging them so as to discourage pecking or eating of the eggs outside of the bays by the hens. By thus avoiding breakage and minimizing dirtying of the eggs, as well as by preventing access by the hens to the conveyer, the invention makes it possible to maintain the conveyer clean and in a sanitary state over long periods of time.

In addition to the foregoing the invention has for an object to provide in a nest of this type a readily replaceable but long lasting mat of flexible, preferably fibrous material, adapted to be held in curved configuration by lateral compression between the walls of the nest and preferably urged conformingly against a forming device beneath it within the nest to define a sloping troughlike floor adapted to deliver the eggs through the egg opening.

A still further feature consists of the inclusion of combined perches and nest closure members having latching mechanism for securing them in their closed position, the arrangement being such that an upward pull or tension applied on the latches may be employed not only to release the latches but also to initiate the opening movement of the members to convert them for use as perches.

The accompanying drawings and following detailed description are exemplary only, but will serve to disclose what is presently contemplated as the best mode of practicing the invention. This, of course, will involve details which may be omitted or changed, as those skilled in the art will understand, without departing from the scope or spirit of the invention.

Figure 2:
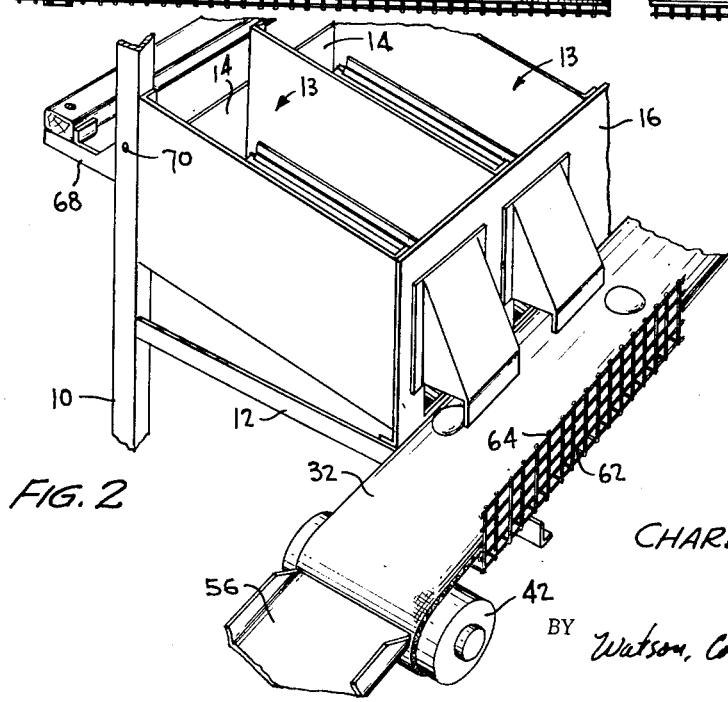

In the drawings:

FIGURE 1 is a top plan view partially broken away of a row or tier of relatively adjoining nests arranged for delivering eggs onto a conveyer common to all of the nests, and incorporating the improved features of the invention, FIGURE 2 is a fragmentary perspective view showing the nests at one end of such a tier or row together with their associated conveying mechanism, FIGURE 3 is an end elevation of the structure shown in FIGURE 1 as seen from the right, FIGURE 4 is a diagrammatic view of the intermittently driven conveyer and its driving control means; and FIGURE 5 is a somewhat enlarged cross sectional view through one of the nests on the line 5—5 of FIGURE 3.

Referring now in more detail to the drawings, these illustrate enough of the overall structure of a battery of laying nests to illustrate the manner in which the improvements of the invention are incorporated in such nests. Thus it will be seen from FIGURE 3 there are shown two vertically superposed tiers of such nests arranged in battery formation and supported by a suitable rigid frame, of which the vertical and transverse interconnected frame members 10 and 12 respectively are shown in FIGURE 3. It will be seen from FIGURE 1 that the vertical frame members 10 are rigidly interconnected by the respective tiers of nests which are supported between them. Since the upper and lower tiers or rows of nests U and L respectively (in FIGURE 3) as well as the individual nests 13 in each row will normally be identically constructed and arranged, it will suffice for the purposes of the present application to describe in detail but one such row.

In the embodiment shown, each tier or row of nests shares parallel front and rear walls 14 and 16 respectively which extend longitudinally and parallel to each other, with the front walls 14 fixedly secured to and supported between the respective upright frame members 10, and the rear walls 16 resting on the transverse frame members 12 and preferably secured thereto. Rigid partitions 18 extending between and secured to the front and rear walls 14 and 16 respectively in uniformly spaced relation, serve effectively to subdivide the space between said walls into the longitudinally aligned nests 13.

The front wall 14 in the form of invention shown is a relatively low one so that the space above it between the adjoining partitions 18 may define ingress openings for the hens to facilitate their entry into and their departure from the respective nests.

At their respective lower edges, the walls 14 and 16 are formed with inwardly turned flanges or ledges 20 and 22 respectively with the ledge 20 disposed at an elevation appreciably above that of the ledge 22. As thus disposed the ledges 20 and 22 provide supports for the sloping bottoms of the nests. As will be seen by reference to FIGURES 1 and 5 in conjunction with FIGURE 3, the bottom of each nest preferably is of composite construction including a relatively stiff trough-like forming or shaping device 24 which may conveniently comprise a piece of arcuately bowed heavy wire mesh, together with a conformingly curved or shaped pad 26 which will preferably be formed of plastic impregnated sisal fibers, though it may also be formed of other materials. The pad 26 itself thus defines the sloping floor of the nest and constitutes the nesting material on which the hens rest and lay the eggs.

It will be seen from FIGURE 5 that both the member 24 and pad 26 are convexly curved, preferably about a vertical plane of symmetry located medially between and parallel to the opposed sidewalls 18 of each nest, these members being somewhat wider than the nest's opposite side edges and compressed laterally between the sidewalls 18 which assist in maintaining its trough-like curvature. Also the pad 26 is preferably held in curved conforming engagement against the bottom member 24 by hold down ledges 28 carried by the opposite sidewalls 18 and projecting inwardly above and in abutting relation with the opposite side edges of the pad 26.

It will be seen that with this arrangement the pads 26, though somewhat wider than their respective nests may be forced downwardly between the walls 18 and into conformingly curved engagement with the bottom member 24, the opposite side edges of the flexible pad being manually disposed beneath the respective ledges 28 which will then retain the pad in its desired position of use.

Each pad 26 thus defines a downwardly sloping trough arranged to guide an egg in its rolling movement through the egg opening 30 of its respective nest for reception on the stationary conveyer 32. Though normally at rest, conveyer 32 is disposed for periodic longitudinal movement along and parallel to the entire row of nests with one edge closely adjacent and substantially at the level of the lower end of the mat 26.

Preferably each egg opening 30 will be substantially centered and symmetrical with respect to the same vertical plane of symmetry about which the pad 26 of its nest is curved. Each opening 30 will be normally of ample size to permit the discharge of one or more eggs from the nest onto the belt 32. But its size and disposition will be such as to prevent egress of the hen onto the belt 32. However, the egg openings 30 all are disposed to permit a clear and unimpeded view by a hen of the egg or eggs delivered onto the belt from its respective nest.

Outside of the egg opening 30 of each nest it is quite desirable in accordance with the invention to provide an egg bay 34 which projects transversely over the adjacent side of the belt 32. In the form illustrated, the bay 34 is provided with a downwardly and outwardly sloping roof 36 and triangular end walls 38 respectively, all spaced sufficiently above the belt 32 to avoid interference with the longitudinal movement of eggs by the belt. The egg bay 32 retains the egg in close relationship to its associated nest, so that a hen within the nest may readily inspect and have access to it, but will be barred from access to eggs on the belt 32 outside of the bay. Each bay 34 will thus in effect constitute a continuation or extension of the nest, communicating with the nest through the opening 30 and permitting a clear view of any eggs within the bay while preventing the hen from moving onto the belt 32 or breaking or dirtying eggs thereon.

For maintaining eggs issuing from each nest closely adjacent the nest opening 30 on the belt 32 each nest is provided with a longitudinal barrier or guide 40 supported just above the conveyer 32 in front of each opening 30. These barriers interrupt the transverse movement of each egg across the conveyer. Thus the egg or eggs from each nest will be readily visible to the hen and, by virtue of the provision of the bays 34, will be in effect within the same enclosure as the hen.

The barriers 40 preferably will be carried by the respective bays 34 and may conveniently be formed as downwardly projecting extensions of the sloping roofs 34 of the respective bays. It will be seen that the barriers 40 are in longitudinal alignment above one side of the belt or conveyer 32 and are relatively longitudinally spaced to leave gaps between them through which eggs may move toward the center of the belt to be conveyed therealong without interference.

A suitable means is provided for moving the respective eggs outwardly onto the central or medial portion of the belt through these gaps whenever the belt or conveyer 32 is moved sufficiently to carry the eggs beyond the ends of their respective barriers 40. In the present embodiment such means is incorporated in the structure of the belt or conveyer itself.

As shown in FIGURE 4, the conveyer may conveniently take the form of an endless belt of flexible fabric which is guided in an endless circuit around and between the respective rollers 42 and 44. The roller 42 is shown as having a driven connection through the conventional drive belt 46 and pulleys 48 and 50 with the output shaft 52 of a conventional electric motor 54. The energizing circuit through the motor may, if desired, be controlled manually to drive the conveyer in the direction indicated by the arrows in FIGURE 4 at selected intervals whereby to effect delivery of the eggs from its upper run onto a delivery chute 56 for delivery to a desired collection point. However, it is preferable to provide an automatic control exemplified in FIGURE 4 by the intermittent timer 58, interposed in the motor circuit 60. Preferably the timer 58 will be of a conventional type which is capable of adjustment to energize the motor 54 and thus drive the conveyer 32. The timer is set so as to permit the belt to remain at rest most of the time and normally to energize the motor and drive the conveyer only for relatively brief periods of time at rather widely spaced intervals for effecting collection of the eggs.

The means for delivering the eggs transversely of the belt and through the gaps between barriers 40 is incorporated in the conveyer structure itself in the preferred embodiment. Thus the operative upper run of the belt is supported between the rolls 42 and 44 for movement along the longitudinally extending relatively rigid wire grating 62 which is supported across and between the longitudinally spaced transverse frame members 12 of its particular tier of nests. It is preferably provided with an upwardly turned vertical confining wall portion 64 to assist in maintaining the eggs on the belt.

As is best shown in FIGURE 3 the supporting grating 62 proper is of channel shape transversely to its length and thus defines a longitudinally extending trough which serves to conformingly shape the run or a portion of the conveyer 32 which is supported on and moves over it. Thus the opposite side edge portions of the belt 32 are turned upwardly and the side edge portion adjacent the nests 10 slopes downwardly in a direction away from the nests and toward the medial portion of the belt whereby to urge the eggs by gravity against the barriers 40 and to cause them to roll by gravity through the gaps or spaces between barriers 40 whenever movement of the belt 32 has proceeded far enough to bring eggs past the respective barriers 40. The lower most area of the belt at the bottom of the trough which it defines will be seen to lie in a line extending longitudinally of the belt and sufficiently to one side of the barriers 40 that the eggs upon gravitating to this particular portion of the belt, after passing between barriers 40, will be maintained on the belt in position to clear the barriers during their movement with the belt.

For assisting the hens in entering the respective nest, each row or tier of nests 13 is preferably provided with an upwardly swingable or foldable perch which may assume the form of a longitudinally extending bar 66 each longitudinally coextensive with its row of nests. These are supported on brackets 68 which are hinged as at 70 to frame members 10 for swinging movement about a longitudinal axis between the open positions shown in full lines in FIGURE 3, and the closed or substantially vertical positions indicated in broken lines in this figure. In the latter position it will be seen that each perch 66 extends across and closely adjacent the front openings of their respective nests. The perches 66 may be swung to this closed position and retained therein at such times as it is desired to prevent entry of the hens to the nests, as for instance to prevent their roosting therein.

In order to permit simultaneous positioning of these combined closures and perches 66, they may be interconnected in conventional manner through a link 72 as shown in FIGURE 3. For securing them in their raised positions to function as closures it will thus suffice to supply but a single latch or latch element designated as 74 in FIGURE 3. This element is pivoted at 76 on one of the brackets 68 for limited swinging movement into and from operative engagement with a keeper or keeper plate 78 fixed on the adjacent frame member 10. The latch 74 is normally biased toward its operative latching position by means of the spring 80 tensioned between the latch arm 82 and the anchor pin 84 fixed to bracket 68 and projecting through the slot 86. This latter slot 86 is arranged to permit only sufficient movement of the latch so that it may readily clear the keeper 78 responsive to an upward force exerted on its actuating arm 88. Such a force may be transmitted through the flexible tension element 90 which may comprise a cord extending from a small motor driven winch (not shown). It will be seen that in the broken line position of the perch 66, as in FIGURE 3, its center of gravity will be substantially above and slightly to the left of the swinging axis defined by the pivots 70, and it will be secured in this position by the latch 74. However, an upward pull transmitted to the lever arm 88 through the cord 90 will swing said latch to the full extent permitted by the slot 86 to release it from the keeper 78. Continued pulling force will thereafter tend to swing the perch 66 outwardly well beyond a dead center position in which its center of gravity is over the axis 70 whereby, upon release of the pull, both of interconnected and similarly positioned perches 66 will fall by gravity to the horizontal position shown in full lines in FIGURE 3. Such horizontal position is determined by abutting engagement between the edges 92 of the respective brackets 68 and one of the webs or flanges of the angular cross section frame member 10. Return of the perches 66 to their closed and latched position may be accomplished manually whenever desired.

In the overall operation of the invention, the nests are placed in readiness for use by releasing latches 74 and lowering the members 66 to their horizontal position for use as perches, as in FIGURE 3. The hens are then free to enter the nests from the perches through the rearward ingress and egress openings between partitions 18 of the respective nests. Whenever a hen in one of the nests lays an egg, the egg will be caused by gravity to move down the sloping channel defined by the pad 26 at the bottom on the nest and will be directed through the relatively aligned opening 30 in the rear of the nest onto the adjacent sloping edge of the conveyer 32 where it will be brought to rest opposite the opening 30 by barrier 40. As long as the belt 32 remains at rest the egg will thus remain on its side edge portion beneath the bay 36 and closely adjacent the nests where it will be readily accessible for view by the hen and will appear to be within the same enclosure as the hen, though the hen will be prevented from getting onto the conveyer 32 together with the egg. Thus breaking and soiling of eggs will be minimized. The conveyer 32 also will be maintained free of soiling for a considerably longer period than would otherwise be possible.

When movement of the conveyer 32 is instituted such egg or eggs are contained within each of the bays 34 and against the respective barriers 40 will move longitudinally with it until each egg comes to the end of its respective barrier 40, at which time the sloping disposition of the conveyer 32 will cause all of the eggs to move away from the nests through the gaps or spaces between barriers 40 and to thereafter move along on the conveyer on the remote side of these barriers from the nests. The upright wall or back stop 64 will serve the function of preventing any eggs from rolling transversely off of the remote edge of the belt.

Having thus described my invention, I claim:

1. A battery of longitudinally and horizontally aligned laying nests, a conveyer having an operative horizontal run disposed for longitudinal movement adjacent said nests, said nest respectively having downwardly opening egg bays projecting transversely outwardly therefrom over said belt, said egg bays communicating with and constituting lateral extensions of the respective nests, each said nest having a floor sloping downwardly to said belt for delivery of eggs by gravity onto the belt, a longitudinally disposed horizontal egg barrier supported from each said bay over and medially of the width of the operative run in the path of eggs moving transversely onto the belt from said nest, whereby to maintain eggs on the conveyer and within the bay so long as the conveyer is at rest, said barriers being relatively longitudinally spaced to define gaps between adjoining said barriers, and means for moving said eggs on the conveyer run transversely through said gaps incident to operation of the conveyer.

2. A battery of laying nests as defined in claim 1 in which said last mentioned means comprises a portion of the belt sloping transversely downwardly away from said nests to cause the eggs to move by gravity through said gaps.

3. A battery of laying nests as defined in claim 1 in which said barrier depends from and constitutes a part of said bay.

4. A battery of laying nests as defined in claim 1 in which each bay communicates with its respective nest through an egg opening of a size to prevent the passage of a hen therethrough, while being of a size and disposition to permit the free transfer of eggs by gravity from the sloping floor of the nest onto said belt within the egg bay.

5. A battery of longitudinally aligned laying nests each having a generally vertical rear wall formed with an egg opening therethrough, and a floor within said nest sloping downwardly toward the lower edge of said opening to deliver eggs by gravity therethrough; an endless conveyer having an operative horizontal run moving parallel to and closely adjacent said walls for reception of eggs delivered through the egg openings, said run sloping transversely downwardly away from said opening for continued movement by gravity of the eggs toward the medial portion of said run, each nest including a longitudinally disposed horizontal egg barrier, and means supporting same over said operative run rearwardly of said openings, each said barrier being transversely spaced from said wall of its nest a sufficient distance to permit the longitudinal movement of eggs on the conveyer between said wall and barrier, whereby to maintain eggs on the conveyer closely adjacent the opening and in view of the mother hens so long as the conveyer remains stationary; said barriers being relatively longitudinally spaced to leave longitudinal gaps between adjoining said barriers, to permit movement of eggs transversely through said gaps incident to movement of the conveyer sufficiently to move the eggs longitudinally abreast of the respective gaps.

6. A battery of laying nests as defined in claim 5 in which each said nest includes a downwardly opening egg bay projecting transversely outwardly from said rear wall above the conveyer and communicating with the nest through said opening to form a transverse extension of the nest, said egg opening being of insufficient size to permit passage of the hen onto the conveyer.

7. A battery of longitudinally aligned laying nests each having a generally vertical rear wall formed with an egg opening therethrough, and a floor within said nest sloping downwardly toward the lower edge of said opening to deliver eggs by gravity therethrough; an endless conveyer having an operative horizontal run moving parallel to and closely adjacent said walls for reception of eggs delivered through the egg openings, and means for moving eggs transversely of the belt through said gaps as they are conveyed longitudinally to positions abreast of the gaps, each nest including a longitudinally disposed horizontal egg barrier, and means supporting same over said operative run rearwardly of said openings, each said barrier being transversely spaced from said wall of its nest a sufficient distance to permit the longitudinal movement of eggs on the conveyer between said wall and barrier, whereby to maintain eggs on the conveyer adjacent the opening and in view of the mother hens so long as the conveyer remains stationary; said barriers being relatively longitudinally spaced to leave longitudinal gaps between adjoining said barriers, to permit movement of eggs transversely through said gaps incident to movement of the conveyer sufficiently to move the eggs longitudinally abreast of the respective gaps.

8. A battery of laying nests as defined in claim 5 including power means in driving relation to said conveyer, and means for intermittently energizing said power means.

9. A laying nest formed with a laterally directed egg opening, and having a floor within said nest sloping downwardly to the lower edge of said opening, a normally inoperative conveyer having an operative run disposed for horizontal movement adjacent said opening and at the level of its said lower edge, a longitudinally extending barrier above said opening for limiting the movement of eggs across the conveyer as they issue from the openign, means for moving said conveyer at spaced intervals of time, and means for moving the eggs across the conveyer transversely to the conveyer movement as they move with the conveyer past said barrier.

10. A laying nest as defined in claim 9 in which said means for moving the eggs across the conveyer comprises a portion of the conveyer sloping transversely downwardly away from said nest.

References Cited in the file of this patent
UNITED STATES PATENTS

| | | |
|---|---|---|
| 2,264,156 | Apple | Nov. 25, 1941 |
| 2,623,499 | King | Dec. 30, 1952 |
| 2,683,438 | Peterson | July 13, 1954 |
| 2,745,379 | Schmidt | May 15, 1956 |
| 2,833,246 | Weber | May 6, 1958 |
| 2,972,333 | Hooper | Feb. 21, 1961 |